(12) United States Patent
Sun et al.

(10) Patent No.: US 10,862,312 B2
(45) Date of Patent: Dec. 8, 2020

(54) ELECTRICAL ENERGY ROUTER AND ELECTRICAL ENERGY ROUTER SUBMODULE

(71) Applicant: TSINGHUA UNIVERSITY, Beijing (CN)

(72) Inventors: Jianning Sun, Beijing (CN); Liqiang Yuan, Beijing (CN); Qing Gu, Beijing (CN); Kainan Chen, Beijing (CN); Zhengming Zhao, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 419 days.

(21) Appl. No.: 15/807,826

(22) Filed: Nov. 9, 2017

(65) Prior Publication Data

US 2018/0351368 A1 Dec. 6, 2018

(30) Foreign Application Priority Data

Jun. 6, 2017 (CN) .......................... 2017 1 0417953

(51) Int. Cl.
*H02J 3/46* (2006.01)
*H02M 7/5387* (2007.01)
(Continued)

(52) U.S. Cl.
CPC ........... *H02J 3/46* (2013.01); *H02M 3/33584* (2013.01); *H02M 7/219* (2013.01); *H02M 7/5387* (2013.01); *H02M 2001/0074* (2013.01)

(58) Field of Classification Search
CPC ...... H02J 3/46; H02M 7/219; H02M 3/33584; H02M 7/5387; H02M 2001/0074;
(Continued)

(56) References Cited

U.S. PATENT DOCUMENTS 6,026,006 A * 2/2000 Jiang ................... H02M 1/4258
363/132
2012/0262966 A1* 10/2012 Luerkens .............. H02M 7/217
363/127

(Continued)

FOREIGN PATENT DOCUMENTS

CN 105610336 A 5/2016

OTHER PUBLICATIONS

Lu et al., "A New Power Circuit Topology for Energy Router," 17th International Conference on Electrical Machines and Systems (ICEMS),Oct. 22-25, 2014, Hangzhou, China, pp. 1921-1925.
(Continued)

*Primary Examiner* — Jared Fureman
*Assistant Examiner* — Emmanuel Dominique
(74) *Attorney, Agent, or Firm* — Hauptman Ham, LLP (57) ABSTRACT

An electrical energy router includes cascaded submodules. Each submodule of the cascaded submodules includes a rectifying stage and an isolating stage. The rectifying stage includes a structure of a neutral point clamped full bridge. The isolating stage includes a DC-DC converter, which includes a primary side, a secondary side and a transformer. The primary side includes a structure of a neutral point clamped half bridge. A DC side of the neutral point clamped half bridge is connected to a DC bus line of the rectifying stage.

16 Claims, 4 Drawing Sheets

(51) Int. Cl.
*H02M 3/335* (2006.01)
*H02M 7/219* (2006.01)
*H02M 1/00* (2006.01)

(58) Field of Classification Search
CPC ........ H02M 2001/0067; H02M 7/487; H02M 7/797; H02M 3/3353
See application file for complete search history.

(56) References Cited

U.S. PATENT DOCUMENTS

| | | | | |
|---|---|---|---|---|
| 2013/0063981 | A1* | 3/2013 | Dujic | H02M 7/219 363/16 |
| 2017/0187296 | A1* | 6/2017 | Zheng | H02M 1/14 |
| 2018/0091037 | A1* | 3/2018 | Zhao | H02M 1/10 |
| 2018/0262117 | A1* | 9/2018 | Lu | H02M 7/797 |

OTHER PUBLICATIONS

Chinese Office Action dated Apr. 29, 2019, issued in corresponding Chinese Patent Application No. 201710417953.1.
Office Action dated Sep. 26, 2018 from corresponding application No. CN 201710417953.1.
Wu et al., "Research on Voltage and Power Balance Control for Three- phase Cascaded Modular Solid-State Transformer", Journal of Power Supply, vol. 13 No. 2, Mar. 2015; pp. 17-26, 32.
Shu et al., "Diode-Clamped Three-Level Multi-module Cascaded Converter Based Power Electronic Traction Transformer", 2015 IEEE 2nd International Future Energy Electronics Conference (IFEEC), Nov. 2015; total 5 pages.
Li et al., "Research on Medium- and High-Voltage Smart Distribution Grid Oriented Power Electronic Transformer", Power System Technology, vol. 37 No. 9, Sep. 2013; pp. 2592-2601.

\* cited by examiner

ELECTRICAL ENERGY ROUTER AND ELECTRICAL ENERGY ROUTER SUBMODULE

FIELD

At least one embodiment of the present invention relates to the field of power electronics, and more specifically, to an electrical energy router and an electrical energy router submodule.

BACKGROUND

With the consumption of fossil energy and the ever-increasing energy crisis, various types of new energy power generation have been valued in recent years. Electrical energy routers with reliable function and high flexibility are needed in the power grid to operate as a hub with different interfaces to different types of electrical energy.

The main functions of electrical energy routers, such as four-quadrant operation, voltage and current transformation and full controllability, have been realized so far in the existing solutions. In addition to the main functions, the utilization rate of power switches is a key factor in the research and development of electrical energy routers. The utilization rate of switching devices is an indicator of whether or not the system design is efficient and the structure is reasonable. Although a variety of implementation schemes have been proposed for electrical energy routers, the circuit structures of the exiting electrical energy routers only aim at realizing the basic functions, but the utilization rate of switching devices which reflects the circuit performance is not taken into account in these schemes. As a result, a high utilization rate of switching devices cannot be ensured, leading to a risk of parameter mismatch and insufficient use of the switching devices.

SUMMARY

An object of at least one embodiment of the present invention is to provide an electrical energy router which can increase the utilization rate of switching devices while realizing basic functions.

An object of at least one embodiment of the present invention is to provide an electrical energy router submodule for constituting the above-mentioned electrical energy router.

According to at least one aspect of the present invention, an electrical energy router comprises cascaded submodules. Each submodule of the cascaded submodules comprises a rectifying stage and an isolating stage. The rectifying stage includes a structure of neutral point clamped full bridge. The isolating stage comprises a DC-DC converter, which includes a primary side, a secondary side and a transformer. The primary side includes a structure of neutral point clamped half bridge. A DC side of the neutral point clamped half bridge is connected to a DC bus line of the rectifying stage.

The above circuit topology increases the matching degree of switching devices in the rectifying stage and in the primary side of the DC-DC converter. The capacity waste of switching devices caused by current level mismatch is reduced and the utilization rate of switching devices is improved.

In at least one embodiment, the secondary side of the DC-DC converter includes a structure of H bridge.

In at least one embodiment, the secondary side of the DC-DC converter includes a structure of neutral point clamped half bridge.

By determining the circuit topology of the secondary side of the DC-DC converter as one of the above-mentioned structures based on a ratio between the DC bus line voltages of the HV side and the LV side, the voltages on both sides of the transformer are in a similar level, and the peak currents flowing through the switching devices on both sides of the transformer are in similar level as well. As a result, the matching degree of the switching devices is increased, the capacity waste of switching devices due to current level mismatch is reduced and the utilization rate of switching devices is increased.

In at least one embodiment, the DC-DC converter is an isolated bidirectional DC-DC converter. The transformer is a high frequency isolated transformer. Two bus line capacitors connected in series are shared between the DC side of the neutral point clamped half bridge and the rectifying stage. An output terminal of the neutral point clamped half bridge and a mutual point of the two bus line capacitors are connected to two taps of the primary side windings of the high frequency isolated transformer respectively. The output terminals of two arms of the H bridge are connected to two taps of the secondary side windings of the high frequency isolated transformer respectively. A voltage of a DC side of the H bridge is stabilized by a DC bus line capacitor.

In at least one embodiment, the DC-DC converter is an isolated bidirectional DC-DC converter. The transformer is a high frequency isolated transformer. Two bus line capacitors connected in series are shared between the DC side of the neutral point clamped half bridge of the primary side of the DC-DC converter and the rectifying stage. An output terminal of the neutral point clamped half bridge and a mutual point of the two bus line capacitors are connected to two taps of the primary side windings of the high frequency isolated transformer respectively. The positive and negative terminals of an AC side of the secondary side of the DC-DC converter are connected to two taps of the secondary side windings of the high frequency isolated transformer respectively. A voltage of a DC side of the secondary side of the DC-DC converter is stabilized by two capacitors connected in series.

In at least one embodiment, switching devices in the DC-DC converter are silicon carbide (SiC) power modules.

Silicon carbide devices have a much lower switching loss than silicon devices, and are suitable for isolated bidirectional DC-DC converters which operate at high frequencies (20 kHz or above). The use of silicon carbide devices in the isolated bidirectional DC-DC converter can achieve the matching between the switching devices and operating modes and reduce the loss. The overall efficiency of the electrical energy router is increased.

In at least one embodiment, the rectifying stages of the cascaded submodules constitute a neutral point clamped full bridge cascaded structure, and the DC bus lines of the secondary sides of the DC-DC converters in the cascaded submodules are connected in parallel as a DC output port.

In at least one embodiment, the electrical energy router comprises arms of three phases, the arm of each phase includes the cascaded submodules, the arms of three phases are in Y connection in which the arms are connected to a mutual point at one end and connected to a three-phase power grid at the other end respectively.

In at least one embodiment, the electrical energy router further comprises a three-phase four-arm inverter connected to the DC output port, wherein the four arms of the three-phase four-arm inverter operate as a neutral point arm and three output arms, respectively, and each output arm and the neutral point arm constitute an independent 220V AC output port, respectively.

At least one aspect of the present invention includes an electrical energy router submodule for constituting the above-mentioned electrical energy router.

In summary, the particular combinations of circuits and devices according to at least one embodiment of the present invention can increase the utilization rate of the switching devices and the system efficiency. For the same power capacity, at least one embodiment of the present invention can achieve more effective use of the switching devices and higher overall efficiency.

BRIEF DESCRIPTION OF THE DRAWINGS

The above and other features and advantages of the present invention can be better understood from the detailed description of the embodiments in conjunction with the drawings, wherein.

DETAILED DESCRIPTION

Embodiments of the present invention will be described in detail in conjunction with the accompanying drawings. These embodiments are only illustrative and for explaining the present invention, but shall not be considered as a limitation thereto. In the figures, the same or similar reference numbers denote the same or similar elements.

Figure 1:
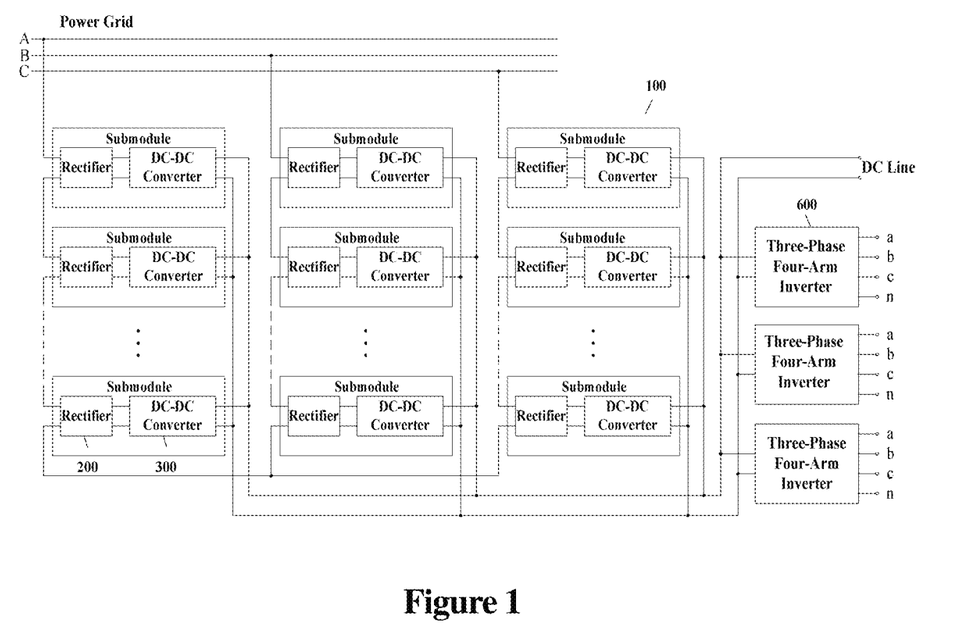
FIG. 1 is a diagram of a general system structure of the electrical energy router of some embodiments of the present invention.

FIG. 1 is a diagram of a general system structure of an electrical energy router 100 according to some embodiments of the present invention. The electrical energy router 100 comprises three-phase Y connection cascaded submodules. Each submodule includes a rectifying stage (indicated by a rectifier 200) and an isolating stage (indicated by a DC-DC converter 300). The modularity of the system can be enhanced by integrating the rectifying stage and the isolating stage into a submodule.

The arm of each phase in the three-phase arm structure includes cascaded submodules, i.e., among the input terminals of each submodule, the upper terminal is connected to a lower terminal of a previous submodule and the lower terminal is connected to an upper terminal of a following submodule. The AC-side voltage of each arm is equal to the sum of AC voltages of all the submodules in the arm. The AC-side current in each submodule in an arm is the same for each submodule and equals to the grid current flowing into the arm. The three-phase arms are in Y connection, i.e., the three arms are connected to a mutual point at one end and connected to a three-phase power grid at the other end, respectively. Low voltage (LV) DC bus lines of the DC-DC converters 300 in all the submodules are connected in parallel as the DC output port of the electrical energy router.

According to at least one embodiment, the electrical energy router 100 may also include a three-phase four-arm inverter 600 connected to the DC output port. The four arms of the three-phase four-arm inverter 600 operate as a neutral point arm and three output arms, respectively. The neutral point arm operates as a common terminal. Each output arm and the neutral point arm constitutes an independent 220V AC output port, respectively.

Figure 2:
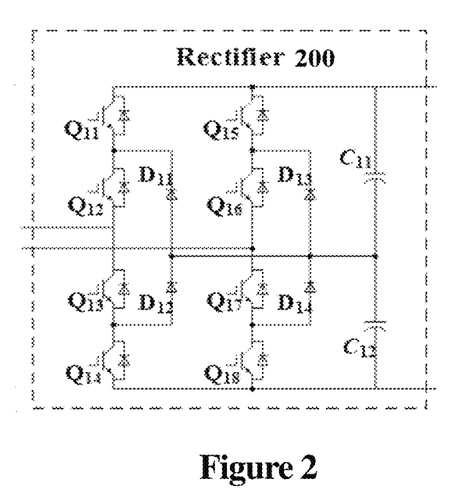
FIG. 2 is a circuit diagram of the rectifying stage in the submodule of some embodiments of the present invention.

FIG. 2 is a circuit diagram of the rectifying stage (indicated by rectifier 200) in the submodule, e.g., submodule in FIG. 1, according to some embodiments of the present invention. The grid current is determined by grid voltage, system power and power factor, and is irrelevant of the voltage of the rectifier, the number of submodules connected in each arm and the circuit topology of the rectifier. In addition, because of the cascaded structure of the rectifiers, the grid current and the current flowing in the rectifiers of all submodules in one phase are the same. Therefore, the current in the rectifier is not related to the voltages of the rectifiers, the number of submodules connected in each arm and the circuit topology of the rectifier. In order to increase the equivalent switching frequency, reduce the filter inductance and guarantee the simplicity, reliability and convenient implementation, the rectifying stage of at least one embodiment of the present invention has a structure of neutral point clamped full bridge.

More specifically, in FIG. 2, the rectifier 200 in each submodule includes eight switching devices and four clamping diodes. The eight switching devices are denoted as $Q_{11} \sim Q_{18}$, and the four clamping diodes are denoted as $D_{11} \sim D_{14}$. Two arms in the rectifier 200 include $Q_{11} \sim Q_{14}$, $D_{11}$, $D_{12}$ and $Q_{15} \sim Q_{18}$, $D_{13}$, $D_{14}$, respectively. $Q_{11} \sim Q_{14}$ are connected in series in order. The cathode of $D_{11}$ is connected to the emitter of $Q_{11}$ and the collector of $Q_{12}$. The anode of $D_{11}$ and the cathode of $D_{12}$ are connected. The anode of $D_{12}$ is connected to the emitter of $Q_{13}$ and the collector of $Q_{14}$. The collector of $Q_{11}$ is connected to the positive terminal of the DC bus line. The emitter of $Q_{14}$ is connected to the negative terminal of the DC bus line. Two capacitors, $C_{11}$ and $C_{12}$, are connected in series as the DC-link capacitors. The anode of $C_{11}$ is connected to the positive terminal of the HV-side DC bus line. The cathode of $C_{11}$ is connected to the anode of $C_{12}$. The cathode of $C_{12}$ is connected to the negative terminal of the HV-side DC bus line. The anode of $D_{11}$, the cathode of $D_{12}$, the anode of $D_{13}$, the cathode of $D_{14}$, the cathode of $C_{11}$ and the anode of $C_{12}$ are connected as a neutral point of the three-level bridge. The emitter of $Q_{12}$ and the collector of $Q_{13}$ are connected as the positive terminal of the AC side of the rectifier 200. The other arm, which includes $Q_{15} \sim Q_{18}$ and $D_{13} \sim D_{14}$, is connected in a similar pattern as that described above. The collector of $Q_{15}$ is connected to the positive terminal of the DC bus line, the emitter of $Q_{18}$ is connected to the negative terminal of the DC bus line. The emitter of $Q_{16}$ and the collector of $Q_{17}$ are connected as the negative terminal of the AC side of the rectifier 200. The DC bus line in the rectifier 200 operates as the high voltage (HV) DC bus line in the submodule and the voltage of the DC bus line is stabilized by $C_{11}$ and $C_{12}$. The positive and negative terminals of the DC bus line serve as the positive and negative output terminals of the DC side of the rectifying stage. The positive AC terminal of each submodule is connected to the negative AC terminal of a previous submodule, and the negative AC terminal is connected to the positive AC terminal of a following submodule, so as to form a cascaded structure. The negative terminals of the respective last submodules in the three phases are connected as a neutral point. The positive terminals of the first submodules in the three phases are connected to each phase of the power grid respectively. The rectifier circuit is embedded into the submodule, wherein the neutral point clamped full bridge is connected to the DC-DC converter 300 so as to form a submodule. The AC terminals of the rectifying stages of the submodules are connected as described above, thus realizing the three-level full bridge cascaded structure.

Figure 3:
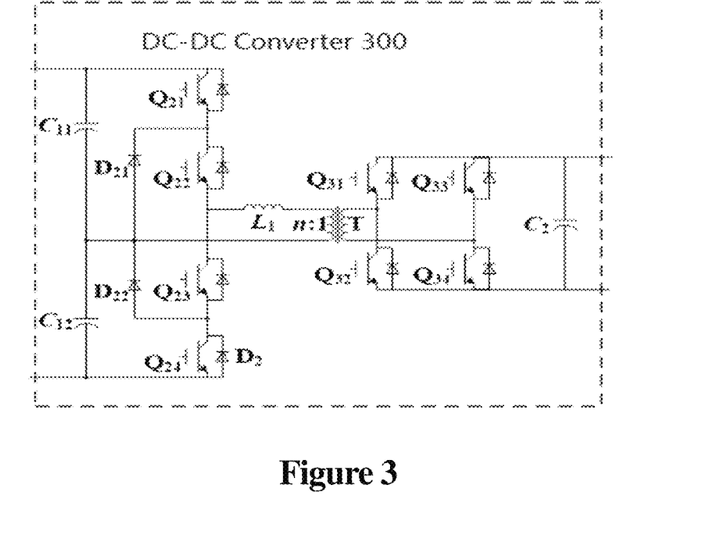
FIG. 3 is a circuit diagram of the first structure of the isolating stage in a submodule of some embodiments of the present invention.
Figure 4:
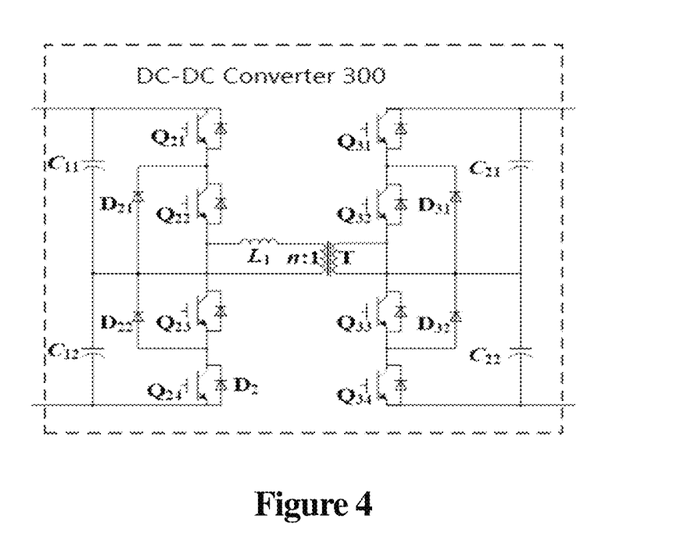
FIG. 4 is a circuit diagram of a second structure of an isolating stage in a submodule of some embodiments of the present invention.

FIG. 3 and FIG. 4 are circuit diagrams of two structures of the isolating stage (indicated by DC-DC converter 300) of a submodule, e.g., submodule in FIG. 1, according to some embodiments of the present invention. In at least one embodiment, the DC-DC converter 300 is an isolated bidirectional DC-DC converter and includes three parts, i.e., an arm in HV side, a high frequency isolated transformer T and an arm in LV side.

In at least one embodiment, the rectifying stage and HV side of the isolating stage share the same DC bus line and thus have the same DC bus line voltage. Based on the single phase shift control strategy of the isolated bidirectional DC-DC converter in the isolating stage and the typical waveform of the transformer current under that control strategy, the peak transformer current can be derived, which is equal to the peak current of the devices connected to the transformer. To balance the peak current in the rectifying stage and in the HV side of the isolating stage, the HV side of the isolating stage has a structure of neutral point clamped half bridge. The output terminal of the half bridge and the neutral point of DC-link capacitors are connected to the two terminals of the primary side of the high frequency transformer in the isolating stage respectively. Such a combination increases the matching degree of devices in the rectifying stage and in the HV side of the isolated bidirectional DC-DC converter. The capacity waste of switching devices caused by current level mismatch is reduced and the utilization rate of switching devices is improved.

Specifically, in the left side of FIG. 3 and FIG. 4, the arm of the HV side of DC-DC converter 300 is a neutral point clamped half bridge, including four silicon carbide switching devices and two silicon carbide clamping diodes. The switching devices are denoted as $Q_{21}$, $Q_{22}$, $Q_{23}$, $Q_{24}$, and the two clamping diodes are denoted as $D_{21}$, $D_{22}$. $Q_{21}$~$Q_{24}$ are connected in series. The emitter of $Q_{21}$ is connected to the emitter of $Q_{22}$, the emitter of $Q_{22}$ is connected to the collector of $Q_{23}$, and the emitter of $Q_{23}$ is connected to the collector of $Q_{24}$. The cathode of $D_{21}$ is connected to the emitter of $Q_{21}$ and the anode of $D_{22}$ is connected to the emitter of $Q_{23}$. The anode of $D_{21}$ and the cathode of $D_{22}$ are connected. The collector of $Q_{21}$ is connected to the positive terminal of the DC bus line of the HV side and the emitter of $Q_{24}$ is connected to the negative terminal of the DC bus line of the HV side. The DC bus line is shared by the rectifying stage and the HV side of the isolating stage in each submodule and the voltage is stabilized by capacitors $C_{11}$ and $C_{12}$. The cathode of $C_{11}$, the anode of $C_{12}$, the anode of $D_{21}$ and the cathode of $D_{22}$ are connected to the negative terminal of the primary side of high frequency isolated transformer T. The emitter of $Q_{22}$ and the collector of $Q_{23}$ are connected to the positive terminal of the primary side of high frequency isolated transformer T through an auxiliary inductor L1.

To achieve higher utilization rate of the switching devices, according to at least one embodiment of the present invention, the structure of the arm of the LV side of isolating bidirectional DC-DC converter is determined based on a ratio between DC bus line voltages in the HV side and the LV side. Specifically, the DC bus line voltage of the LV side of the isolating stage is designed as required by the application condition. When the DC bus line voltage ratio between the HV side and the LV side is around 1:1, a neutral point clamped half bridge is used on the LV side. When the DC bus line voltage ratio between the HV side and the LV side is is around or larger than 2:1, an H bridge is used on the LV side. As such, the voltages on both sides of the transformer are in a similar level, and the peak currents flowing through the switching devices on both sides are in similar level as well. As a result, the matching degree of the switching devices is increased, the capacity waste of switching devices due to current level mismatch is reduced and the utilization rate of switching devices are increased.

Specifically, in FIG. 3, a first structure of the arm of the LV side is an H bridge, which includes four silicon carbide switching devices. The switching devices are denoted as $Q_{31}$, $Q_{32}$, $Q_{33}$, $Q_{34}$. Two arms in the H bridge includes $Q_{31}$, $Q_{32}$ and $Q_{33}$, $Q_{34}$ respectively. The emitter of $Q_{31}$, the collector of $Q_{32}$ and the positive terminal of secondary side of high frequency transformer T are connected. The emitter of $Q_{33}$, the collector of $Q_{34}$ and the negative terminal of secondary side of high frequency transformer T are connected. The collectors of $Q_{31}$ and $Q_{33}$ are connected to the positive terminal of DC bus line of the LV side. The emitters of $Q_{32}$ and $Q_{34}$ are connected to the negative terminal of DC bus line of the LV side. The anode and cathode of DC link capacitor $C_2$ are connected to the positive and negative terminals of DC bus line respectively and the DC bus line voltage is stabilized by DC link capacitor $C_2$.

Referring to FIG. 4, a second structure of the arm of the LV side is a neutral point clamped half bridge, which consists of four silicon carbide switching devices and two silicon carbide clamping diodes. The switching devices are denoted as $Q_{31}$, $Q_{32}$, $Q_{33}$, $Q_{34}$ and the clamping diodes are denoted as diodes $D_{31}$, $D_{32}$. $Q_{31}$~$Q_{34}$ are connected in series. The emitter of $Q_{31}$ is connected to the collector of $Q_{32}$, the emitter of $Q_{32}$ is connected to the collector of $Q_{33}$, and the emitter of $Q_{33}$ is connected to the collector of $Q_{34}$. The cathode of $D_{31}$ is connected to the emitter of $Q_{31}$, the anode of $D_{31}$ and the cathode of $D_{32}$ are connected, and the anode of $D_{32}$ is connected to the emitter of $Q_{33}$. The collector of $Q_{31}$ is connected to the positive terminal of DC bus line of the LV side and the emitter of $Q_{34}$ is connected to the negative terminal of the DC bus line of the LV side. The voltage of DC bus line of the LV side is stabilized by two capacitors $C_{21}$ and $C_{22}$ connected in series. The anode of $C_{21}$ is connected to the positive terminal of the DC bus line of the LV side, the cathode of $C_{21}$ is connected to the anode of $C_{22}$, and the cathode of $C_{22}$ is connected to the negative terminal of the DC bus line of the LV side. The emitter of $Q_{32}$ and the collector of $Q_{33}$ are connected to the positive terminal of secondary side of high frequency transformer T. The cathode of $C_{21}$, the anode of $C_{22}$, the anode of $D_{31}$ and the cathode of $D_{32}$ are connected to the negative terminal of the secondary side of high frequency transformer T.

The positive and negative terminals of the DC bus line of the HV side of the isolated bidirectional DC-DC converter 300 are connected to the positive and negative terminals of the DC bus line of the rectifying stage 200. The positive terminals of the LV side of all the submodules are connected and the negative terminals of the LV side of all the submodules are connected, i.e., the DC bus lines of the LV side of the isolated bidirectional DC-DC converters in all the submodules are connected in parallel. The structure of the arm of the LV side of the isolating stage is determined by the ratio between DC bus line voltages of the HV side and the LV side. The structure in FIG. 3 is used when the voltage ratio is close to or larger than 2:1, and the structure in FIG. 4 is used when the voltage ratio is around 1:1.

As be described above, some embodiments of the present invention use silicon carbide power modules as the switching devices of the HV and LV sides of the isolating stage based on the high frequency (20 kHz or higher) characteristics of the isolated bidirectional DC-DC converter. Silicon carbide devices have a much lower switching loss than silicon devices, and are suitable for isolated bidirectional DC-DC converters which operate at high frequencies. Therefore, use of silicon carbide devices in isolated bidirectional DC-DC converter can achieve the matching between the switching devices and operating modes and reduce the loss. The overall efficiency of the electrical energy router is increased.

Figure 5:
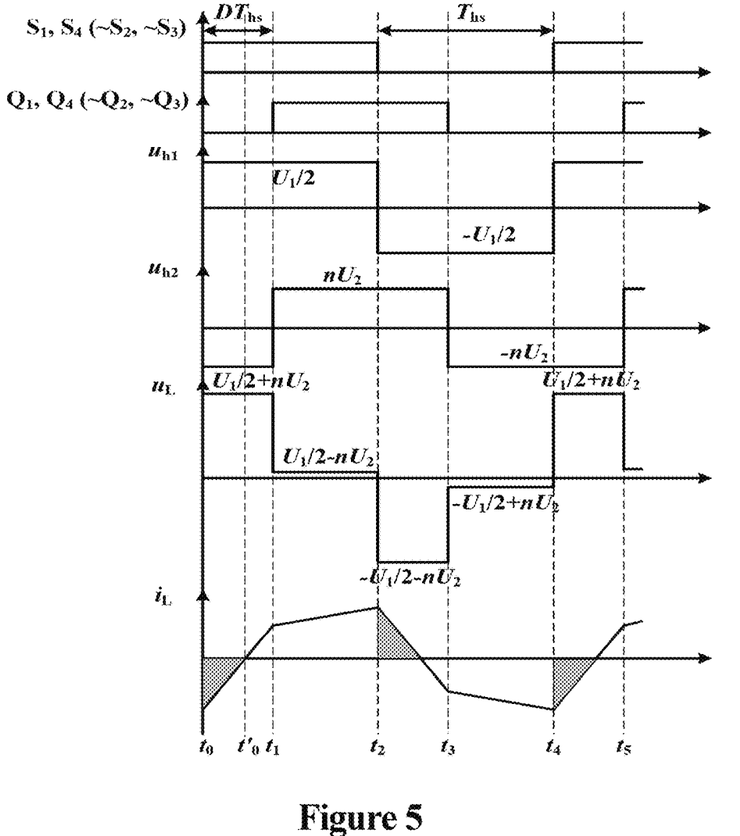
FIG. 5 is a timing diagram of a typical voltage and leakage inductance current waveforms of an isolated bidirectional DC-DC converter using single phase shift control of some embodiments of the present invention.

FIG. 5 is a typical voltage and leakage inductance current waveforms of the isolated bidirectional DC-DC converter 300 using single phase shift control method according to some embodiments of the present invention. Based on the voltage and current waveforms, the transmission power in normal operation can be expressed as:

$$P_{DC\_DC} = \frac{n\frac{U_H}{2}U_L}{2f_{DC\_DC}L_1}D(1-D) \quad (1)$$

where $P_{DC\_DC}$ is the rated transmission power of an isolated bidirectional DC-DC converter 300, n is the turn ratio between the primary side and secondary side of the high frequency transformer T, $U_H$ is the DC bus line voltage of the HV side, $U_L$ is the DC bus line voltage of the LV side, $f_{DC\_DC}$ is the rated operational frequency of the isolated bidirectional DC-DC converter 300, $L_1$ is the leakage inductance of the high frequency transformer T, and D is the rated phase shift ratio in the modulation.

The inductance of leakage inductor is expressed as:

$$L_1 = \frac{n\frac{U_H}{2}U_L}{2f_{DC\_DC}P_{DC\_DC}}D(1-D) \quad (2)$$

Based on the inductance of leakage inductor and the voltages of the primary side and secondary side of the transformer, the maximum value of transformer current in the primary side can be derived.

$$I_{m\_DCDC} = \frac{nU_L}{4f_{DC\_DC}L_1}(k+2D-1) \quad (3)$$

where $I_{m\_DCDC}$ is the maximum value of transformer current in primary side in the isolated bidirectional DC-DC converter and $k=U_H/(2nU_L)$.

The AC current in the rectifying stage can be calculated by the power of each phase, phase voltage and power factor.

$$I_{m\_conv} = \frac{\sqrt{2}P_{phase}}{U_{phase}\cos\varphi} \quad (4)$$

where $I_{m\_conv}$ is the maximum value of AC current in the rectifying stage, $P_{phase}$ is the rated transmission power in each phase, $U_{phase}$ is the rms phase voltage, and $\cos\varphi$ is the power factor.

The voltage and power of each phase of the power grid can be expressed as (5) and (6)

$$P_{phase} = NP_{DC\_DC} \quad (5)$$

$$U_{phase} = \frac{NmU_H}{\sqrt{2}} \quad (6)$$

where N is the number of cascaded submodules in the arm of each phase, and m is the modulation ratio of the rectifiers.

Substituting typical parameters, i.e., k=1, D=0.3, m=0.9, and $\cos\varphi$=0.9 into equations (3) and (4), equation (7) can be obtained.

$$\frac{I_{m\_conv}}{I_{m\_DCDC}} \approx 1 \quad (7)$$

For an isolated bidirectional DC-DC converter with an H bridge structure in the HV side, the current ratio between the rectifying stage and the isolating stage is around 2:1. In contrast, with at least one embodiment of the present invention which applies the particular circuit combination, the current ratio between the rectifying stage and the isolating stage is around 1:1. Therefore, the selection of switches is unified in different operating conditions. The capacity waste of switching devices due to the current level mismatch is avoided and the utilization rate of switching devices is increased.

Figure 6:
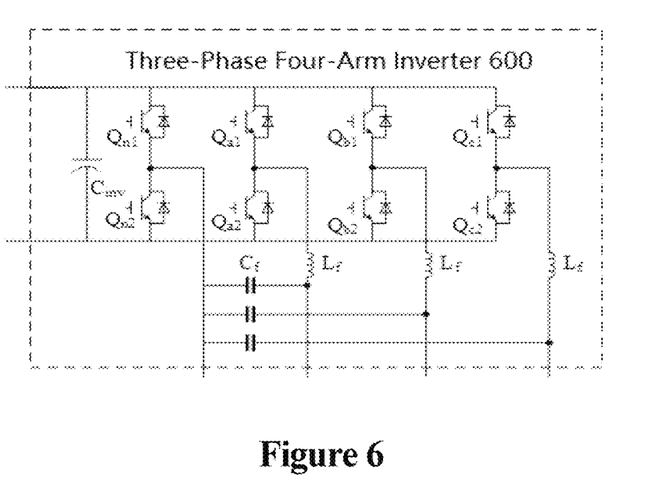
FIG. 6 is a circuit diagram of a three-phase four-arm inverter of some embodiments of the present invention.

Referring to FIG. 6, the three-phase four-arm inverter 600 in FIG. 1 includes eight switching devices. The switching devices are denoted as $Q_{n1}$, $Q_{n2}$, $Q_{a1}$, $Q_{a2}$, $Q_{b1}$, $Q_{b2}$, $Q_{c1}$, $Q_{c2}$, $Q_{n1}$ and $Q_{n2}$, $Q_{a1}$ and $Q_{a2}$, $Q_{b1}$ and $Q_{b2}$, $Q_{c1}$ and $Q_{c2}$ are connected in series and constitute the arms respectively. The emitter of $Q_{n1}$ and the collector of $Q_{n2}$ are connected as the neutral point of the inverter. The emitter of $Q_{a1}$ and the collector of $Q_{a2}$ are connected as the output terminal of phase a of the inverter. The emitter of $Q_{b1}$ and the collector of $Q_{b2}$ are connected as the output terminal of phase b of the inverter. The emitter of $Q_{c1}$ and the collector of $Q_{c2}$ are connected as the output terminal of phase c of the inverter. The collectors of $Q_{n1}$, $Q_{a1}$, $Q_{b1}$ and $Q_{c1}$ are connected to the positive terminal of the DC bus line of the inverter. The emitters of $Q_{n2}$, $Q_{a2}$, $Q_{b2}$ and $Q_{c2}$ are connected to the negative terminal of the DC bus line of the inverter. The anode and cathode of the DC link capacitor $C_{inv}$ are connected to the positive terminal and negative terminal of the DC bus line respectively. The voltage of the DC bus line is stabilized by the DC link capacitor $C_{inv}$. The positive and negative terminals of the DC bus line of the inverter 600 are connected to the positive and negative terminals of the DC output of the LV side of the isolated bidirectional DC-DC converter 300 respectively.

Figure 7:
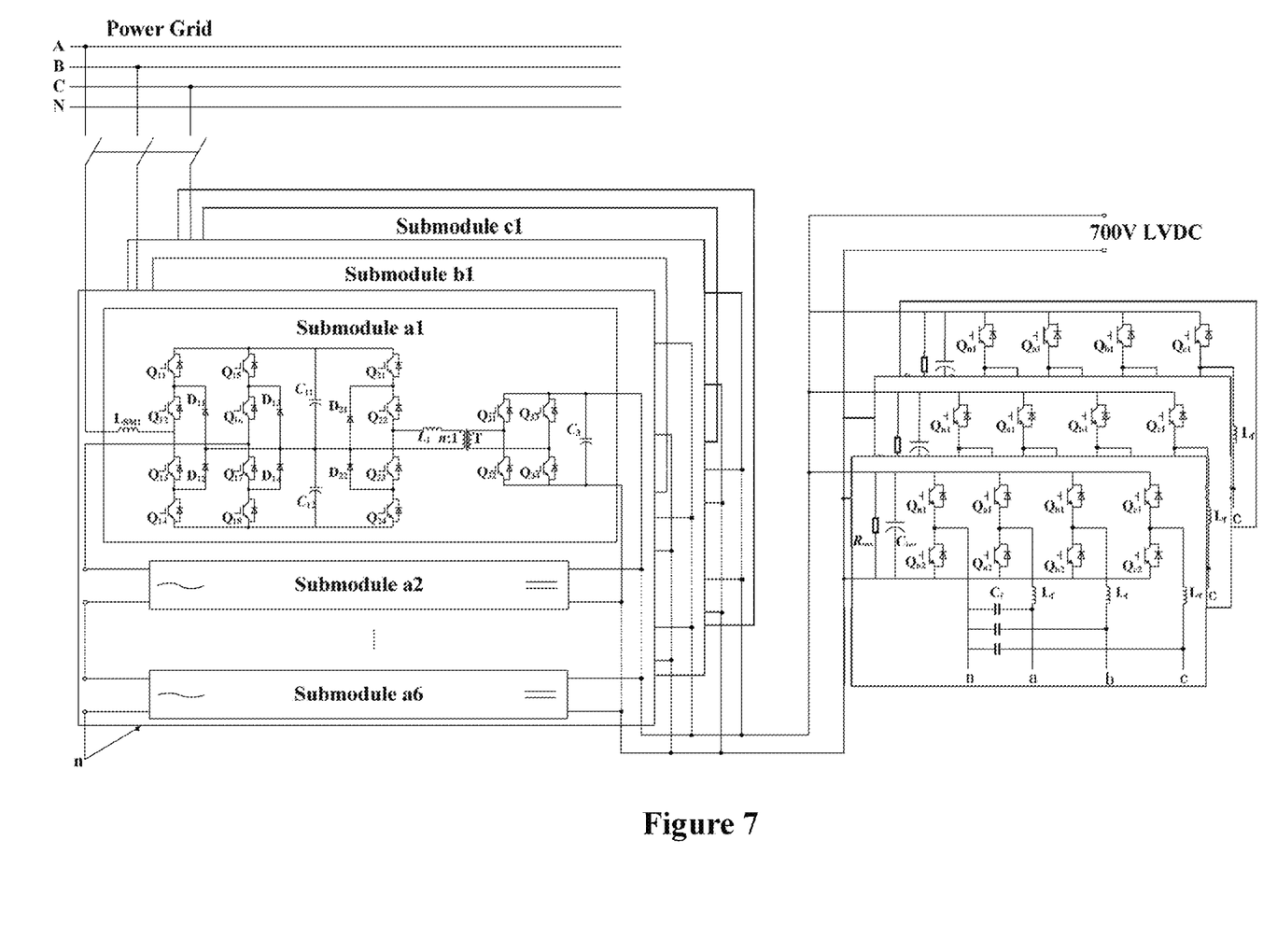
FIG. 7 is a system diagram of an example of some embodiments of the present invention.

FIG. 7 is an application example of some embodiments of the present invention. Suppose that the electrical energy router is required to connect 10 kV AC grid and 700V LVDC port. According to at least one embodiment of the present invention, the voltage of the DC bus line in the HV side of the isolated bidirectional DC-DC converter is set to or around 700V or 1400V. Since the rectifying stage and the HV side of the isolating stage have a common DC bus line voltage, the DC bus line voltage of the rectifying stage is also set to or around 700V or 1400V. In order to avoid a too large number of cascaded submodules in the arm of each phase and a is too large number of PWM control ports, the voltage of DC bus line in the HV side is set to the level of 1400 V. Considering the types of switching devices in the market, the topology of rectifier and the safety margin, switching devices with 1200V blocking voltage are used. In order to fully use the voltage capacity of switching devices, the DC bus line voltage in the HV side is determined as 1500 V. Based on the relationship between the voltage of the DC bus line and the phase voltage of the power grid, the number of cascaded submodules in each phase is determined as 6 and the modulation ratio of the rectifying stage is determined as 0.91. Thus, the voltage ratio between DC bus line voltages of HV side and LV side is about 2:1 and H bridge is determined to be used on the LV side of the isolating bidirectional DC-DC converter. The DC bus line voltage of the three-phase four-arm inverter is equal to the DC bus line voltage of LV side of the isolated bidirectional DC-DC converter, which is 700 V. Therefore, switching devices with 1200V blocking voltage are used in the inverter. As a result, the system structure is determined as follows. The circuit topology shown in FIG. 2 is used for the rectifying stage of the submodules, and the switching devices are 1200V silicon carbide MOSFET power modules. The circuit topology shown in FIG. 3 is used for the isolating stage and the switching devices are 1200V silicon carbide MOSFET power modules. The circuit topology shown in FIG. 6 is used for the inverter and the switching devices are 1200V IGBT power modules. Every 6 submodules are cascaded to construct a phase arm. The negative terminals of the three phase arms are connected to a mutual point in Y connection and the positive terminals of the three phase arms are connected to the corresponding phase of the power grid respectively. As such, the design of the electrical energy router with high utilization rate of switching devices is completed and the specific parameters like current level may be determined by the actual operating power.

Embodiments of the present invention have been described in conjunction is with the drawings. The embodiments are only illustrative but not intended to limit the scope of the present invention. Those skilled in the art may make various modifications, equivalent replacement and improvements without departing the spirit and principle of the present invention. The protection scope of the present invention are defined by the appended claims only.

What is claimed is:

1. An electrical energy router, comprising:
cascaded submodules,
each submodule of the cascaded submodules comprises a rectifying stage and an isolating stage, wherein:
the rectifying stage comprises a structure of a neutral point clamped full bridge,
the isolating stage comprises a DC-DC converter, which includes a primary side, a secondary side and a transformer, wherein the primary side comprises a structure of a neutral point clamped half bridge, and a DC side of the neutral point clamped half bridge is connected to a DC bus line of the rectifying stage, wherein:

$$I_{m\_conv} = \frac{\sqrt{2}\,P_{phase}}{U_{phase}\cos\varphi}$$

where $I_{m\_conv}$ is a maximum value of AC current in the rectifying stage, $P_{phase}$ is a rated transmission power in each phase, $U_{phase}$ is a rms phase voltage, and $\cos\varphi$ is a power factor, and $$1_{m\_DCDC} = \frac{nU_L}{4f_{DC\_DC}L_1}(k + 2D - 1)$$

where $I_{m\_DCDC}$ is a maximum value of transformer current in the primary side, n is a turn ratio between a primary side and a secondary side of the transformer, $k=U_H/(2nU_L)$, $U_H$ is a DC bus line voltage of HV side, $U_L$ is a DC bus line voltage of LV side, $f_{DC\_DC}$ is a rated operational frequency of the DC-DC converter, $L_1$ is a leakage inductance of the transformer, and D is a rated modulation phase shift ratio.

2. The electrical energy router according to claim 1, wherein the secondary side of the DC-DC converter comprises a structure of an H bridge.

3. The electrical energy router according to claim 1, wherein the secondary side of the DC-DC converter comprises a structure of a neutral point clamped half bridge.

4. The electrical energy router according to claim 2, wherein the DC-DC converter is an isolated bidirectional DC-DC converter, the transformer is a high frequency isolated transformer, two bus line capacitors connected in series are shared between the DC side of the neutral point clamped half bridge and the rectifying stage, an output terminal of the neutral point clamped half bridge is connected to a first tap of a primary side windings of the high frequency isolated transformer, a mutual point of the two bus line capacitors is connected to a second tap of the primary side windings of the high frequency isolated transformer, an output terminal of a first arm of two arms of the H bridge is connected to a first tap of two taps of a secondary side windings of the high frequency isolated transformer, an output terminal of a second arm of the two arms of the H bridge is connected to a second tap of the two taps of the secondary side windings of the high frequency isolated transformer, and a DC bus line capacitor is configured to stabilize a voltage of a DC side of the H bridge.

5. The electrical energy router according to claim 3, wherein the DC-DC converter is an isolated bidirectional DC-DC converter, the transformer is a high frequency isolated transformer, two bus line capacitors connected in series are shared between the DC side of the neutral point clamped half bridge of the primary side of the DC-DC converter and the rectifying stage, an output terminal of the neutral point clamped half bridge is connected to a first tap of two taps of a primary side windings of the high frequency isolated transformer, a mutual point of the two bus line capacitors is connected to a second tap of the two taps of the primary side windings of the high frequency isolated transformer, a positive terminal of an AC side of a secondary side of the DC-DC converter is connected to a first tap of two taps of a secondary side windings of the high frequency isolated transformer, a negative terminal of the AC side of secondary side of the DC-DC converter is connected to a second tap of the two taps of the secondary side windings of the high frequency isolated transformer, and two capacitors connected in series are configured to stabilize a voltage of a DC side of the secondary side of the DC-DC converter.

6. The electrical energy router according to claim 1, wherein switching devices in the DC-DC converter are silicon carbide (SiC) power modules.

7. The electrical energy router according to claim 1, wherein the rectifying stages of the cascaded submodules form a neutral point clamped full bridge cascaded structure, and the DC bus lines of the secondary sides of the DC-DC converters in the cascaded submodules are connected in parallel as a DC output port.

8. The electrical energy router according to claim 7, wherein the electrical energy router comprises arms of three phases, an arm of each of the three phases comprises the cascaded submodules.

9. The electrical energy router according to claim 8, wherein the arms of three phases are in Y connection in which each of the arms is connected to a mutual point at one a first end and is connected to a three-phase power grid at a second end opposite the first end.

10. The electrical energy router according to claim 8, further comprising a three-phase four-arm inverter connected to the DC output port, wherein a first arm of the four arms of the three-phase four-arm inverter is configured to operate as a neutral point arm, three arms of the four arms of the three-phase four-arm inverter are configured to operate as three output arms, and each of the three output arms and the neutral point arm form an independent 220V AC output port.

11. An electrical energy router submodule comprising:
a rectifying stage comprising a structure of a neutral point clamped full bridge; and
an isolating stage comprising a DC-DC converter, which includes a primary side, a secondary side and a transformer, wherein the primary side comprises a structure of a neutral point clamped half bridge, and a DC side of the neutral point clamped half bridge is connected to a DC bus line of the rectifying stage, wherein $$I_{m\_conv} = \frac{\sqrt{2}\,P_{phase}}{U_{phase}\cos\varphi}$$

where $I_{m\_conv}$ is a maximum value of AC current in the rectifying stage, $P_{phase}$ is a rated transmission power in each phase, $U_{phase}$ is a rms phase voltage, and $\cos\varphi$ is a power factor, and $$I_{m\_DCDC} = \frac{nU_L}{4f_{DC\_DC}L_1}(k + 2D - 1)$$

where $I_{m\_DCDC}$ is a maximum value of transformer current in the primary side, n is a turn ratio between a primary side and a secondary side of the transformer, $k=U_H/(2nU_L)$, $U_H$ is a DC bus line voltage of HV side, $U_L$ is a DC bus line voltage of LV side, $f_{DC\_DC}$ is a rated operational frequency of the DC-DC converter, $L_1$ is a leakage inductance of the transformer, and D is a rated modulation phase shift ratio.

12. The electrical energy router submodule according to claim 11, wherein the secondary side of the DC-DC converter comprises a structure of an H bridge.

13. The electrical energy router submodule according to claim 11, wherein the secondary side of the DC-DC converter comprises a structure of a neutral point clamped half bridge.

14. The electrical energy router submodule according to claim 12, wherein the DC-DC converter is an isolated bidirectional DC-DC converter, the transformer is a high frequency isolated transformer, two bus line capacitors connected in series are shared between the DC side of the neutral point clamped half bridge and the rectifying stage, an output terminal of the neutral point clamped half bridge is connected to a first tap of a primary side windings of the high frequency isolated transformer, a mutual point of the two bus line capacitors is connected to a second tap of the primary side windings of the high frequency isolated transformer, an output terminal of a first arm of two arms of the H bridge is connected to a first tap of two taps of a secondary side windings of the high frequency isolated transformer, an output terminal of a second arm of the two arms of the H bridge is connected to a second tap of the two taps of the secondary side winding of the high frequency isolated transformer, and a DC bus line capacitor is configured to stabilize a voltage of a DC side of the H bridge.

15. The electrical energy router submodule according to claim 13, wherein the DC-DC converter is an isolated bidirectional DC-DC converter, the transformer is a high frequency isolated transformer, two bus line capacitors connected in series are shared between the DC side of a neutral point clamped half bridge of the primary side of the DC-DC converter and the rectifying stage, an output terminal of the neutral point clamped half bridge is connected to a first tap of two taps of a primary side windings of the high frequency isolated transformer, a mutual point of the two bus line capacitors is connected to a second tap of the two taps of the primary side windings of the high frequency isolated transformer, a positive terminal of an AC side of a secondary side of the DC-DC converter is connected to a first tap of a secondary side windings of the high frequency isolated transformer, a negative terminal of the AC side of secondary side of the DC-DC converter is connected to a second tap of the two taps of the secondary side windings of the high frequency isolated transformer, and two capacitors connected in series are configured to stabilize a voltage of a DC side of the secondary side of the DC-DC converter.

16. The electrical energy router submodule according to claim 11, wherein switching devices in the DC-DC converter are silicon carbide (SiC) power modules.

* * * * *